(12) United States Patent
Critz et al.

(10) Patent No.: US 7,139,686 B1
(45) Date of Patent: Nov. 21, 2006

(54) REPORT GENERATOR FOR A MATHEMATICAL COMPUTING ENVIRONMENT

(75) Inventors: David Critz, Newton, MA (US); Loren Dean, Hopedale, MA (US)

(73) Assignee: The Mathworks, Inc., Natick, MA (US)

( * ) Notice: Subject to any disclaimer, the term of this patent is extended or adjusted under 35 U.S.C. 154(b) by 0 days.

(21) Appl. No.: 09/517,952

(22) Filed: Mar. 3, 2000

(51) Int. Cl.
G06F 17/10 (2006.01)

(52) U.S. Cl. .................... 703/2; 703/6; 703/13; 706/45

(58) Field of Classification Search .................. 703/2, 703/6, 13; 706/45; 715/522; 709/227
See application file for complete search history.

(56) References Cited

U.S. PATENT DOCUMENTS

| | | | |
|---|---|---|---|
| 5,835,922 A * | 11/1998 | Shima et al. | 715/522 |
| 6,101,489 A * | 8/2000 | Lanner et al. | 706/45 |
| 6,377,993 B1 * | 4/2002 | Brandt et al. | 709/227 |

OTHER PUBLICATIONS

Young et al., "A knowledge based electronic information and documentation system", ACM, Jan. 2000.*
Weitz, "SGML nets: Integrating document and workflow modeling", IEEE, 1998.*
Skidmore et al., "A prototype notebook based environment for computational tools", IEEE, 1998.*
Frank, "Enhancing object oriented modeling with concepts to integrate electronic documents", IEEE, 1997.*

* cited by examiner

Primary Examiner—Paul L. Rodriguez
Assistant Examiner—Kandasamy Thangavelu
(74) Attorney, Agent, or Firm—Lahive & Cockfield, LLP

(57) ABSTRACT

A method and apparatus, including a computer program apparatus, implementing techniques for generating a report from a technical computing environment provided by a mathematical computer program. A report generator defines a set of reporting components that can be assembled to form a report template and processes the reporting components of the report template in order to extract data from the mathematical computing environment and generate the report. The report generator includes a user interface by which a designer can hierarchically assemble the reporting elements, which are defined according to an object-oriented programming language. The report generator bi-directionally communicates with the mathematical computing environment such that the report generator can evaluate expressions defined within the mathematical computing environment, change initial conditions and parameters of a mathematical model, and issue commands to advance the simulation time of the model. The report generator includes a generation engine that generates an intermediate representation of the report and a transformation engine that transforms the intermediate representation into an electronic document according to a user-selected format.

16 Claims, 11 Drawing Sheets

Formating Components

| Component | Output / Behavior |
|---|---|
| cfrcelltable | Cell Table |
| cfrsection | Chapter/Subsection |
| cfrimage | Image |
| cfrlink | Link |
| cfrlist | List |
| cfrparagraph | Paragraph |
| cfrtext | Text |
| cfr_titlepage | Title Page |

*Fig. 8A*

Graphic Handling Components

| Component | Output / Behavior |
|---|---|
| chgfigloop | Figure Loop |
| chgfigproptable | Figure Property Table |
| chgfigsnap | Graphics Figure Snapshot |
| chgobjname | Graphics Object Name |
| chgproperty | Handle Graphics Parameter |

*Fig. 8B*

Logical & Flow Control Components

| Component | Output / Behavior |
|---|---|
| cloelse | <if> Else |
| cloelseif | <if> Elseif |
| clothen | <if> Then |
| clofor | For Loop |
| cloif | Logical If |

*Fig. 8C*

Technical Computing Components

| Component | Output / Behavior |
|---|---|
| cmleval | Evaluate an Expression |
| cmlvariable | Insert Variable |
| cml_ver | MATLAB/Toolbox Version Number |
| cmlwhos | Variable Table |

*Fig. 9A*

Reporting Components

| Component | Output / Behavior |
|---|---|
| crg_comment | Comment |
| crgempty | Empty Component |
| crg_import_file | Import File |
| crgnestset | Nest Setup File |
| crg_halt_gen | Stop Report Generation |
| crgtds | Time/Date Stamp |

*Fig. 9B*

Simulator Components

| Component | Output / Behavior |
|---|---|
| cslsortblocklist | Block Execution Order |
| csl_blk_loop | Block Loop |
| csl_blk_proptable | Block Property Table |
| cslblockcount | Block Type Count |
| csl_mdl_changelog | Model Change Log |
| csl_functions | Model Functions |
| csl_mdl_loop | Model Loop |
| csl_mdl_proptable | Model Property Table |
| cslsim | Model Simulation |
| csl_variables | Model Variables |
| csllinktarget | Object Linking Anchor |
| csllinkname | Object Name |
| cslproperty | Object Property |
| csl_summ_table | Object Summary Table |
| cslscopesnap | Scope Snapshot |
| csl_sig_loop | Signal Loop |
| csl_sig_proptable | Signal Property Table |
| cslfilter | System Filter |
| cslsyslist | System Hierarchy |
| csl_sys_loop | System Loop |
| csl_sys_proptable | System Property Table |
| cslsnapshot | System Snapshot |

*Fig. 10A*

State Control Components

| Component | Output / Behavior |
|---|---|
| csf_hier_loop | Stateflow Loop |
| csf_obj_report | Stateflow Object Report |
| csf_prop_table | Stateflow Property Table |
| csf_snapshot | Stateflow Snapshot |
| crg_halt_gen | Stop Report Generation |

*Fig. 10B*

REPORT GENERATOR FOR A MATHEMATICAL COMPUTING ENVIRONMENT

TECHNICAL FIELD

The invention relates to a computer program for generating reports from a mathematical computing environment.

BACKGROUND

Conventional mathematical tools, such as such as MATLAB™ from MathWorks™, Inc., of Natick, Mass., provide a comprehensive technical computing environment for performing numerical linear algebraic calculations, solving ordinary differential equations, analyzing data, and visualizing solutions to complex mathematical formulas by generating graphs or other images. The computing environment often provides a high-level programming language that includes a variety of operators and programming commands.

Engineers use such mathematical tools for a variety of applications such as designing complex mechanical and electrical control systems, solving optimization problems and performing statistical analysis. Engineers often use these mathematical tools in conjunction with a simulation tool for defining and simulating complex systems using mathematical models. For example, manufacturers of mechanical and electronic systems, e.g., cars and integrated circuits, use simulation tools to help them design their products. These tools allow designers to build and test mathematical models of their systems before building a physical prototype. Commercial simulation models can be extremely complex and may include thousands of interconnected functional blocks. Using a simulation tool, a designer can simulate and observe changes in a model over a period of time, typically represented as a series of discrete instants, called time steps, such as 1 millisecond, 1 second, 2 hours, etc. Starting from a set of initial conditions, specified by the designer, the simulation tool drives the model and determines the state of the model at various time steps.

To examine and present information generated by the technical computing environment and the simulation tool, designers often create several types of reports. Because commercial models are so complex, the designer can create a myriad of reports, each report serving a particular purpose. Typical reports include, for example, a title, the name of the author, a brief text description of the report, a legend, and, of course, the actual data drawn from the model during simulation. Many of these elements are fixed while others vary over time when the simulation data in the model changes.

A designer, therefore, faces many tradeoffs when designing a report including determining the structure of the report, specifying the fixed elements and the varying elements of the report and where they should be positioned. This can be particularly difficult for varying elements because it requires that the designer extract data from the model while the simulation is running. Often, the designer wishes to generate a report for a particular state of the model, or time step associated with the simulation. This can be difficult because simulations often take many hours to complete. In addition, the designer must save the report in a format convenient to run the same report multiple times and that can be easily shared with others.

Many conventional simulation programs and modeling tools exist that have limited ability to generate reports. However, most report generator programs provide only a small number of reports, and allow, at most, only certain limited customizations such as changing the title of the report and the name of the author.

SUMMARY OF THE INVENTION

In general, the invention provides a method and apparatus, including a computer program apparatus that provides an object-oriented, component-based report programming language by which a designer can easily customize and assemble a report at various levels of hierarchical abstraction.

In one aspect, the invention is directed to a method of generating a report from a technical computing environment provided by a mathematical tool. According to the method, a set of reporting components is defined that can be assembled to form a report template. The reporting components of the report template are processed to perform one or more operations within the computing environment. A report is generated as a function of the processed reporting components.

In another aspect, the invention is directed to a report generator computer program that defines a set of reporting components that can be assembled to form a report template and processes the reporting components of the report template in order to extract data from a model simulator and generate the report. The report generator includes a user interface by which a designer can hierarchically assemble the reporting elements, which are defined according to an object-oriented programming language. The report generator and the technical computing environment bi-directionally communicate such that the report generator is able to evaluate expressions in the technical computing environment, change initial conditions and parameters of the model, and issue commands to the technical computing environment to advance the current simulation time of a simulation model. In one embodiment, the report generator issues commands using an internal programming language of the technical computing environment. The report generator can, therefore, control the simulation in order to produce a report on a state at a particular time step. The report generator includes a generation engine that generates an intermediate representation of the report and a transformation engine that transforms the intermediate representation into an electronic document according to a user-selected format.

The details of various embodiments of the invention are set forth in the accompanying drawings and the description below. Other features and advantages of the invention will become apparent from the description, the drawings, and the claims.

BRIEF DESCRIPTION OF THE DRAWINGS

FIGS. 8A, 8B and 8C, 9A and 9B and 10A and 10B illustrate one embodiment of a suitable set of report components that can be used to define and generate a corresponding report.

DETAILED DESCRIPTION

Figure 1:
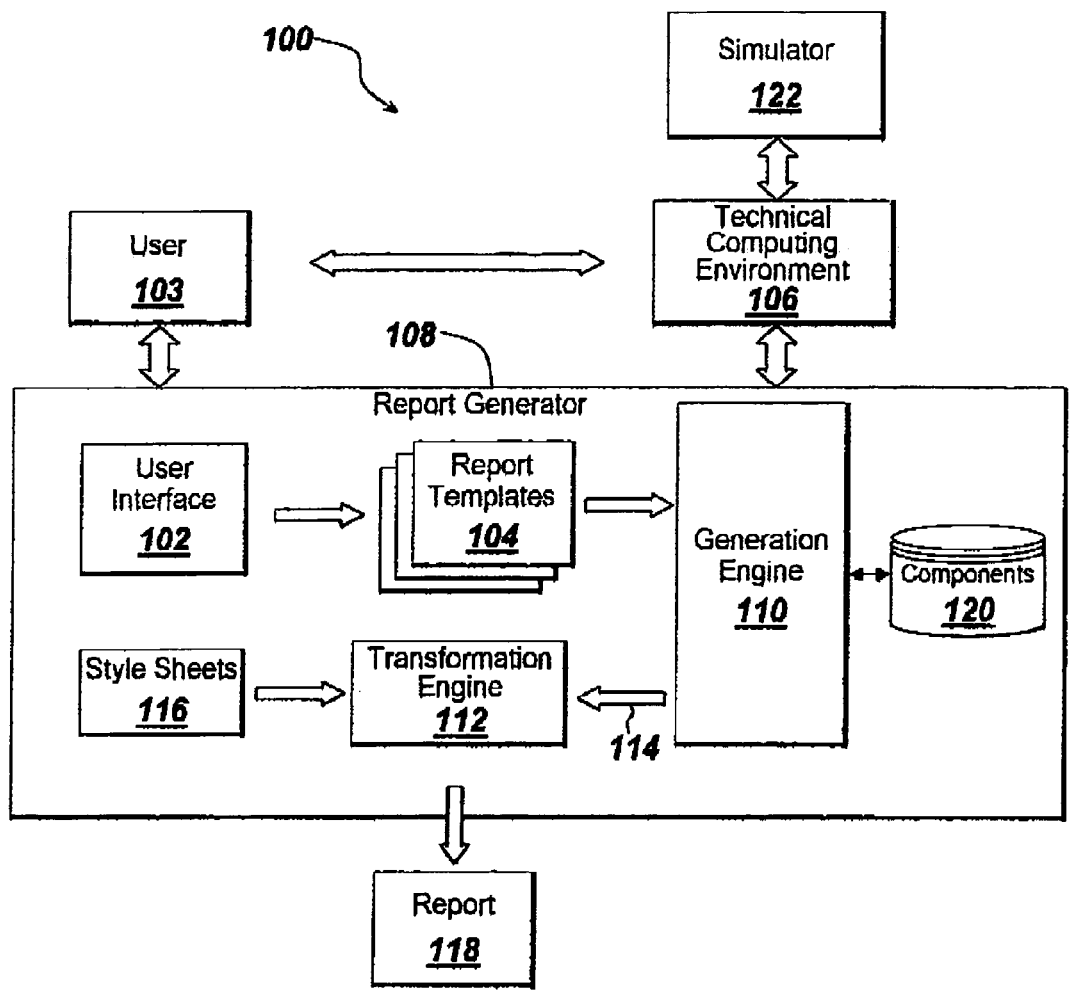
FIG. 1 is a block diagram providing a high-level overview of a report generator that generates a report according to the invention.

FIG. 1 is a block diagram providing a high-level overview of a tool 100 including report generator 108 that interacts with technical computing environment 106 and simulator 122 to generate report 118. Technical computing environment 106 combines numeric computation, mechanisms for importing and exporting data in a variety of formats, graphic display of data, and a high-level programming language. The high-level programming language provides flow-control constructs and often includes a variety of operators for performing numerical analysis, string manipulation, and even graphical user interface (GUI) design.

User 103 interacts with computing environment 106 to perform a wide variety of numeric computations such as the creation and manipulation of N-dimensional arrays. For example, user 103 can define a square matrix within calculation workspace 106 using a single command. The user 103 can directly manipulate the matrix, using one command to find its inverse, another command to find its transpose, or another command to learn its determinant. Computing environment 106 includes a command interpreter that sequentially executes the commands entered by user 103. A calculation workspace provided by computing environment 106 stores the resultant data as well as component definitions and interconnection data that define the current model.

Simulator 122 interacts with computing environment 106 in order to simulate the system using the model defined within the calculation workspace. Simulator 122 includes various algorithms and processes for advancing the simulation time and stores state information of the model during the simulation.

As described in detail below, report generator 108 defines a set of report components 120, each report component 120 having a defined behavior such as inserting data or other information into report 118. Generation engine 110 creates an environment for components 120 to operate and processes each component according to the component's defined behavior. Based on the execution of the reporting components 120, generation engine 110 makes a variety of decisions such as how to format report 118 and what data to include in report 118.

For example, when processed by generation engine 110, each report component 120 produces a variety of output data such as formatted text, lists, tables, links, and images, or controls the execution of generation engine 110 through the reporting process. The output data can be predefined or can be extracted from computing environment 106. In addition, a component 120 may direct generation engine 110 to import external information. For example, the model may reference external code files to help with more complex calculations. When external code files are available in source form, generation engine 110 can includes these files into report 118. Generation engine 110 can also import external text files and images in many other formats. A subset of report components 120 define a reporting programming language having flow control constructs such as for-loops, while-loops and if-then-else statements.

Each report template 104 identifies a corresponding set of report components 120 that, when executed by generation engine 110, generate a corresponding report 118. User 103 interacts with report generator 108 via user interface 102 and creates a report template 104 by selecting and assembling components 120 as a hierarchical tree. The user 103 can modify the resultant report 118 by adding or deleting components 120 from the component hierarchy of the corresponding report template 104. In addition, user 103 can define new report components or modify the properties of existing report components 120. A report template 104 can also refer to other report templates 104. In this manner, output report 118 can combine results from several report templates 104, where there results from a report template 104 can depend on the results from prior report templates 104. In one implementation, a report template 104 can be recursively defined.

When generation engine 110 processes a report template 104, each component 120 acts independently, but its behavior is influenced by ancestor components in the component hierarchy. More specifically, within the hierarchy, each component 120 controls the order and manner in which its child components are executed. In one embodiment, report components 120 are implemented in an object oriented programming language, such as C++, Java, or a proprietary language, and are derived from a common base class.

Report 118 is an electronic document in one of a number of conventional formats such as Hypertext Markup web format (HTML), Microsoft Word interchange format (RTF), a typesetting format such as TeX, and Adobe Frame Maker interchange format (MIF). Generation engine 110 produces an intermediate representation 114 of a given report in an abstract form. Transformation engine 112 processes intermediate representation 110 to produce the report 118 in a user-selected document format.

In one embodiment generation engine 110 produces intermediate representation 114 as either Standard Generalized Markup Language (SGML) or Extensible Markup Language (XML). SGML is a format for organizing and tagging elements of a document. Notably, SGML does not specify any particular formatting; rather, it specifies rules for tagging elements. These tags can then be interpreted to format elements in different ways. XML is derived from SGML and is a markup language especially designed for "web" documents, i.e., documents exchanged over the Internet. Style sheets 116 include rules defining how transformation engine should transform the intermediate representation 114 into report 118.

Figure 2:
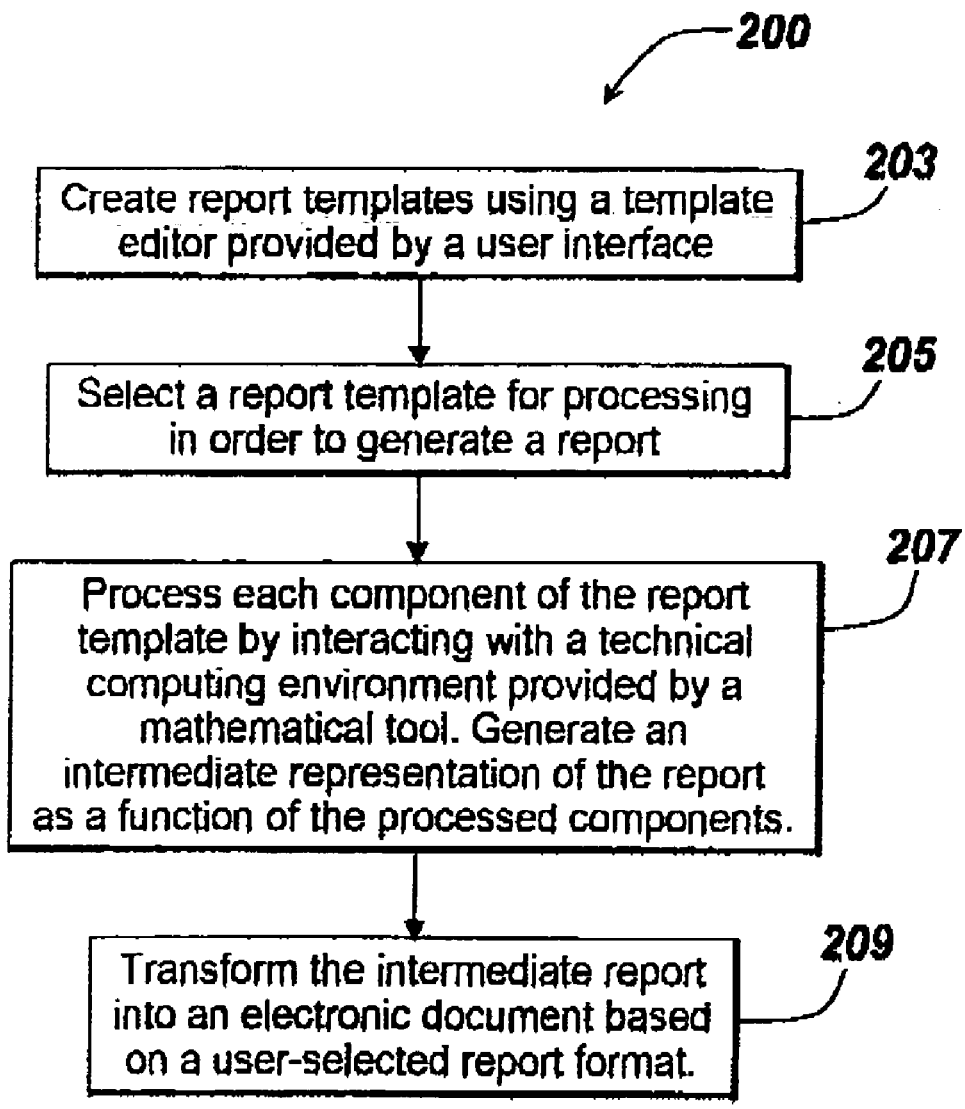
FIG. 2 is a flow chart illustrating one embodiment of a process, suitable for implementation in a computer program, in which the report generator that operates on a set of object-oriented reporting elements to interact with a model simulator in order to generate the report.

FIG. 2 is a flow chart illustrating one embodiment of a process 200, suitable for implementation in a computer program application, in which report generator 108 (FIG. 1) interacts with computing environment 106 and simulator 122 to generate report 118. Report generator 108 presents user interface 102 by which user 103 creates one or more report templates 104 (block 203). User interface 102 provides a graphical editor for creating and editing report templates 104 and a component creation wizard for defining new components for inclusion in a report template 104. Creation of a report template 104, however, is optional and may be skipped if user 103 elects to use a previously defined report template 104.

Upon request, user interface 102 provides a list of all of the report templates 104. In order to generate corresponding report 118, user 103 selects one of the report templates 104 and instructs generation engine 110 to process the selected report template 104 to generate report 118 (step 205).

In response, generation engine 110 loads the selected report template 104 and creates an environment for components 120 to operate (block 207). Generation engine 110 bi-directionally communicates with computing environment 106 and issues commands to computing environment 106 using the high-level programming language provided by computing environment 106. Computing environment 106 interprets and executes the commands as if they had been entered directly by user 103. In this manner, reporting components 120 can perform a variety of functions within the computing environment 106 including requesting data from the calculation workspace, evaluating an expression defined within the workspace, requesting data from simulator 122 and requesting data from a graphics package. In addition, reporting components 120 can change the state of the simulation model. For example, a reporting component can simulate the system using the model, increment the simulation time by one or more time steps, change a parameter or initial condition of the model or even change the model itself by adding or removing a functional block. Reporting components 120 can also execute external processes that change the state of the calculation workspace.

While processing each component of the selected report template 104, generation engine 110 produces an intermediate representation 114 of report 118. This is advantageous because intermediate representation 114 is in a generic, abstract form that can be readily converted into a wide variety of document formats (block 207). In one embodiment intermediate representation 114 is formatted according to a generalized markup language such as SGML or XML.

Transformation engine 112 processes intermediate representation 114 to produce the report 118 in a user-selected document format such as Hypertext Markup web format (HTML), Microsoft Word interchange format (RTF), a typesetting language such as TeX, and Adobe Frame Maker interchange format (MIF) (block 209).

Figure 3:
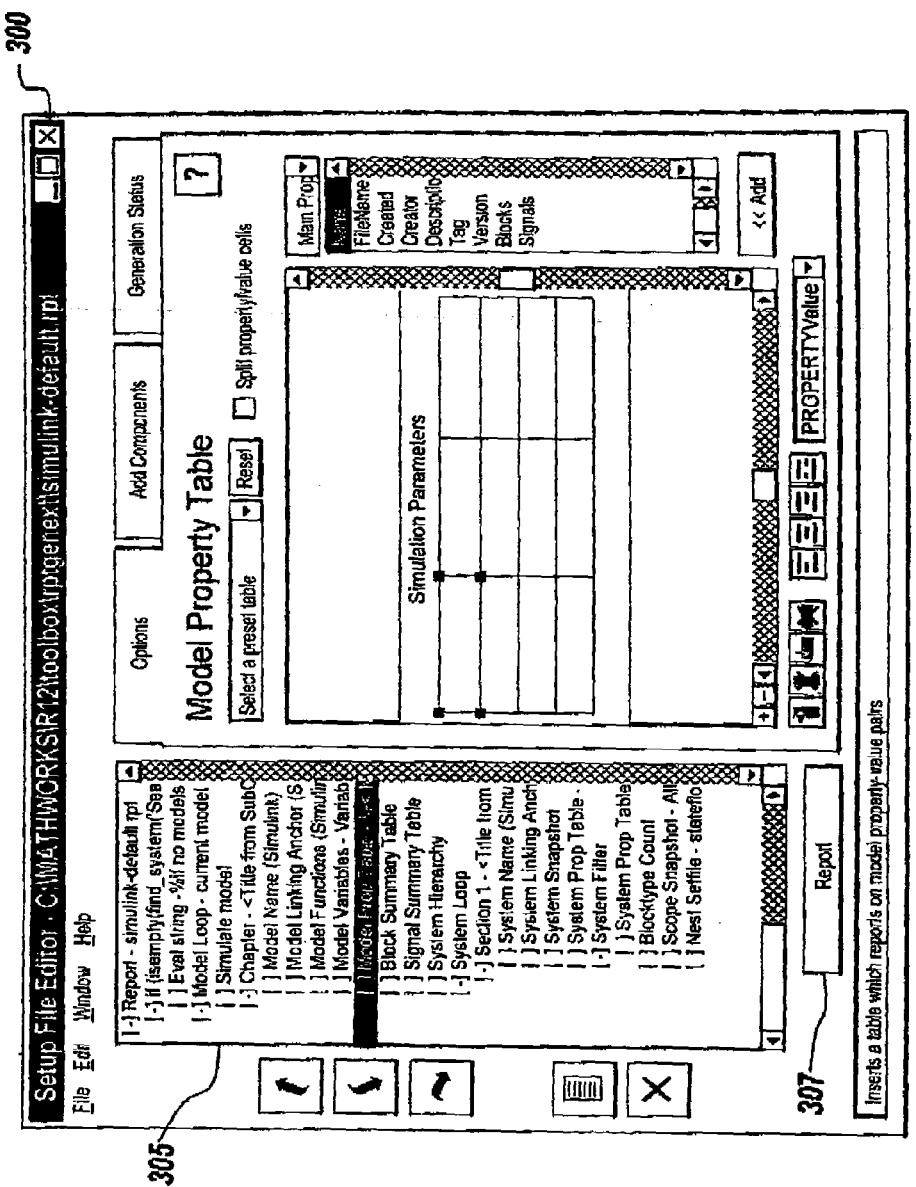
FIG. 3 illustrates one embodiment of a graphical editor displayed by a user interface of the report generator by which a report designer can create and maintain report templates.

FIG. 3 illustrates one embodiment of a graphical editor 300 displayed by user interface 102 by which user 103 can create and maintain report templates 104. Notably, editor 300 presents the hierarchy of components 305 defined by a corresponding report template. Using editor 300, user 103 can rearrange the order of the components 305, modify properties for the components 305, add new components and, by clicking on button 307, generate a report 118 for the report template 104 that is currently being edited.

Figure 4:
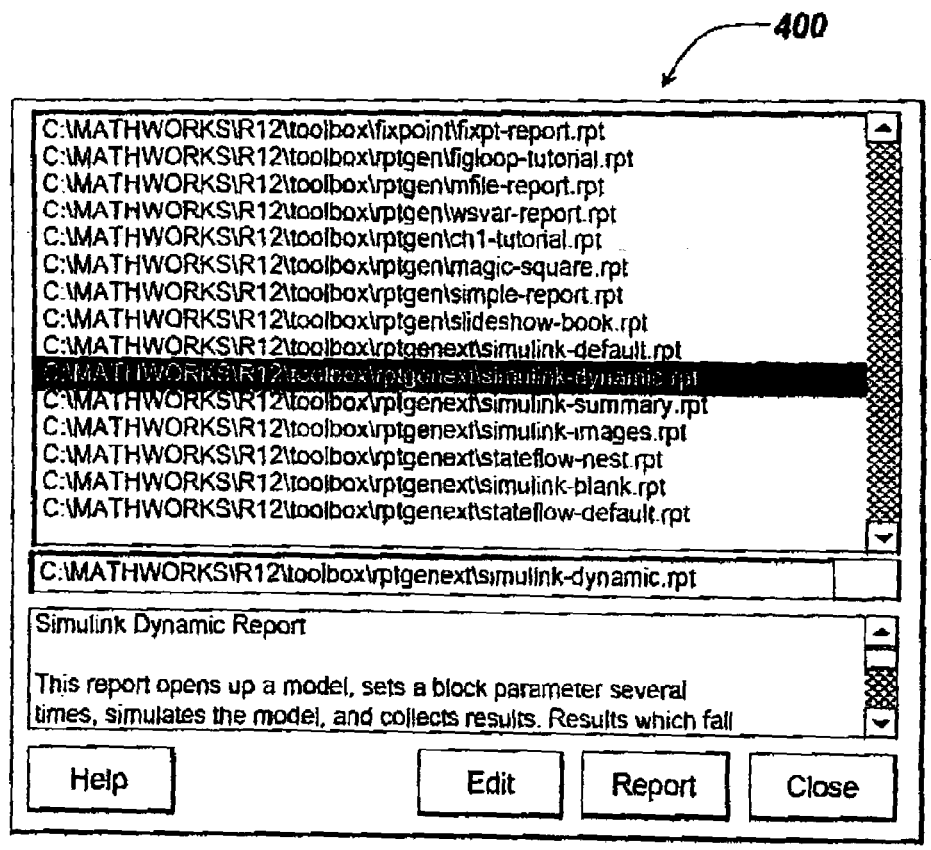
FIG. 4 illustrates one embodiment of a window displayed by the user interface for selecting a report template from a list of report templates for editing or printing.

FIG. 4 illustrates one embodiment of a window 400 displayed by user interface 102 by which user 103 can scroll through a list of report templates 114. Upon selecting a report template 104 from the list, the designer can elect to edit the report template or can instruct generation engine 110 to process the selected report template 104 and generate the corresponding report 118. In one embodiment, user interface 102 can be bypassed such that user 103 can generate reports 118 from a command line interface provided by an operating system.

Figure 5:
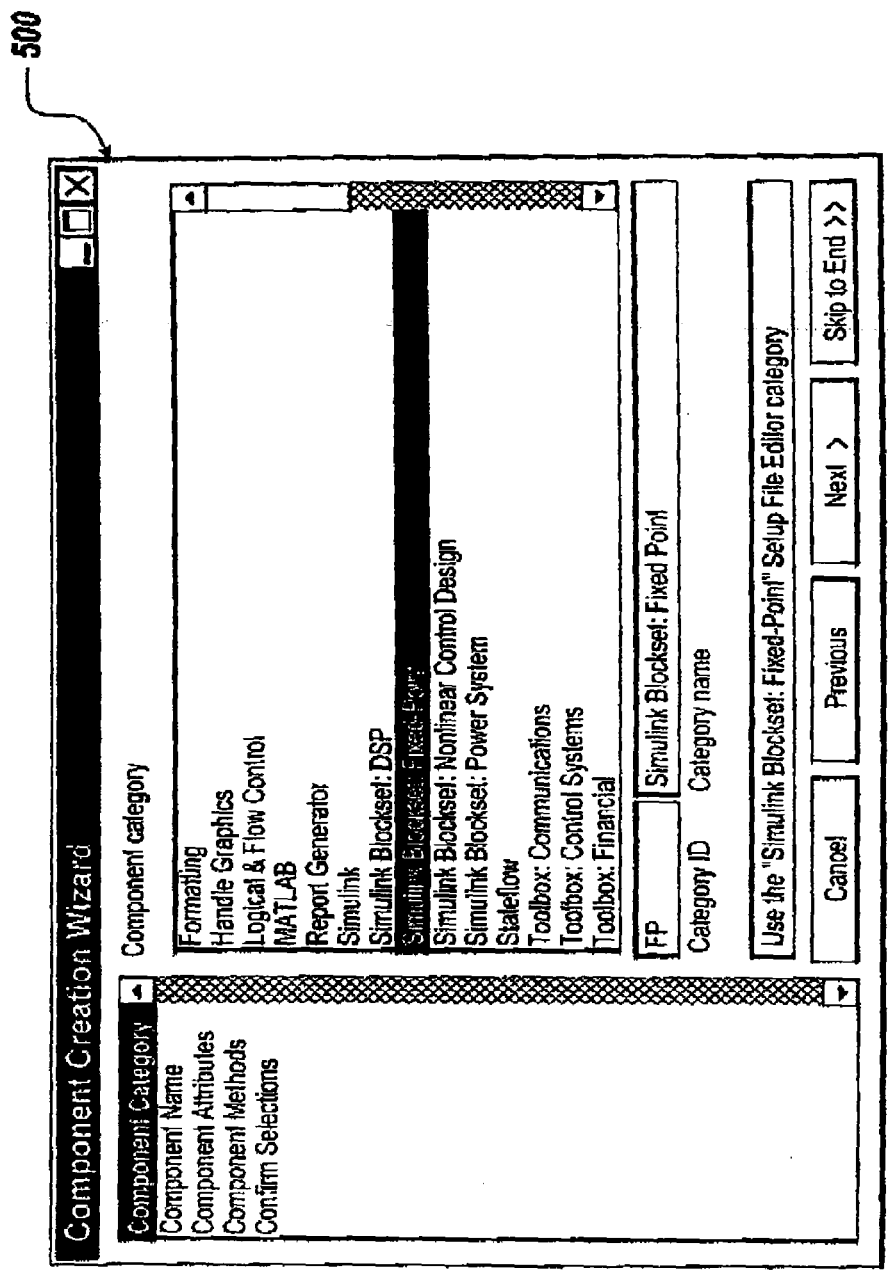
FIG. 5 illustrates one embodiment of a component creation wizard displayed by the user interface for creating and customizing new report components.

FIG. 5 illustrates one embodiment of a component creation wizard 400 displayed by user interface 102 by which user 103 creates and customizes new report components. Using wizard 400, user 103 assigns the new component to a component category and defines various attributes and methods for the component.

Figure 6:
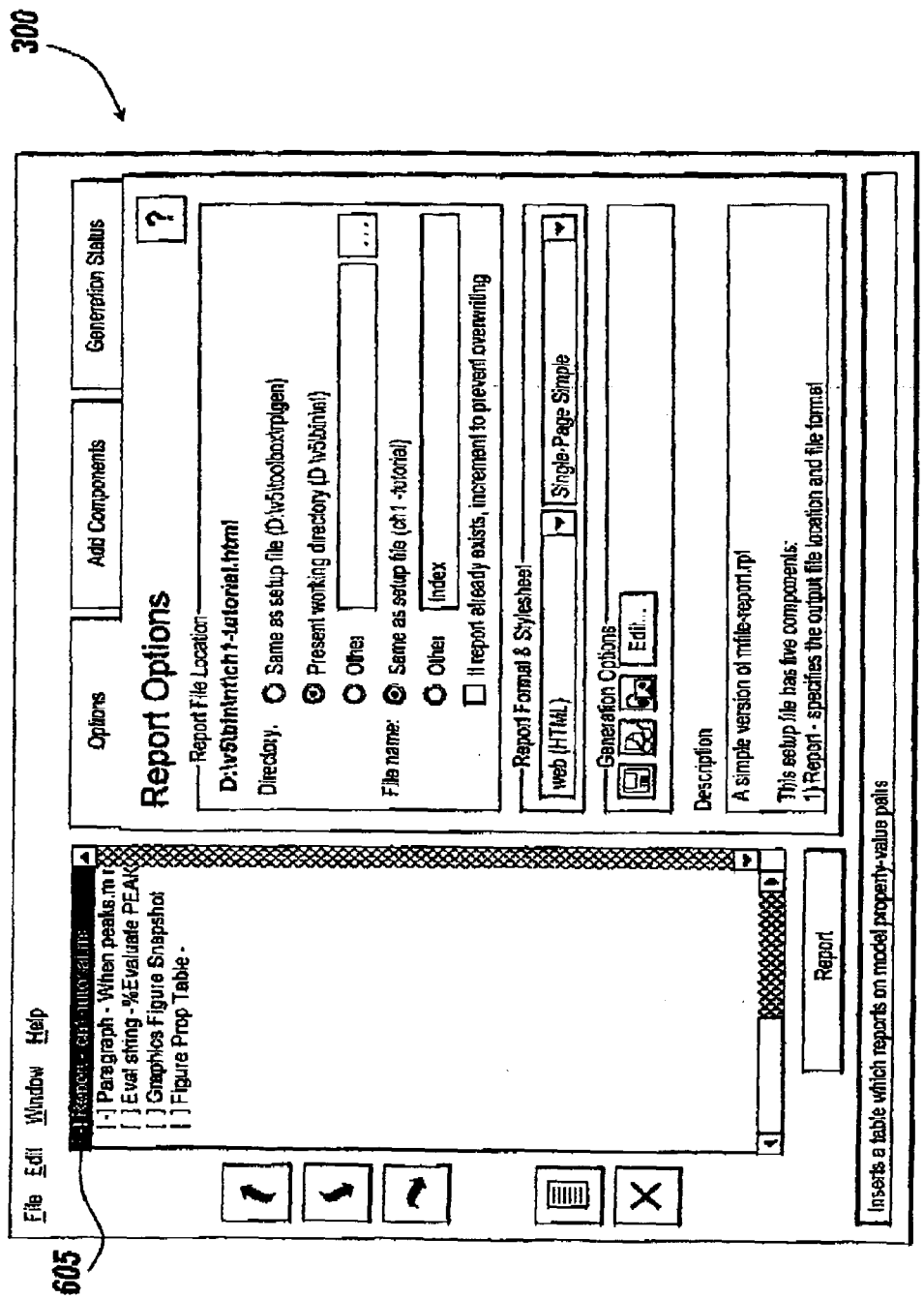
FIG. 6 illustrates the graphical editor listing reporting components for another example report template.
Figure 7:
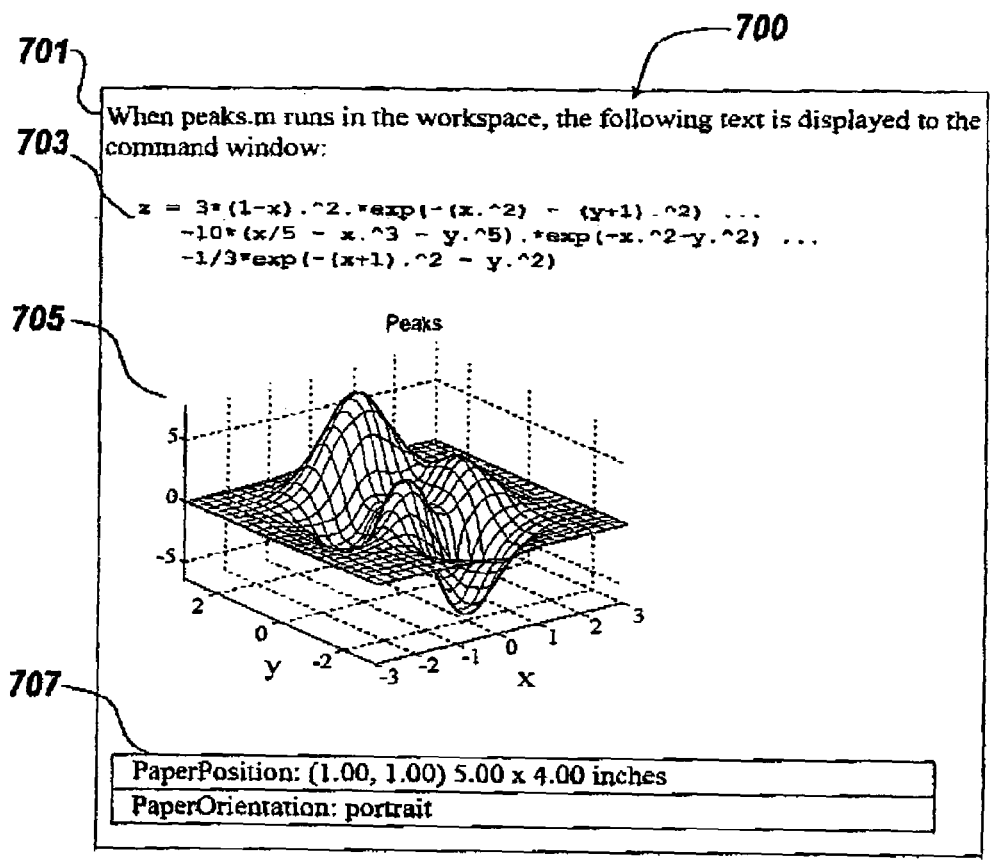
FIG. 7 illustrates a corresponding report produced by the report generator for the example report template illustrated in FIG. 6.

FIG. 6 illustrates graphical editor 300 (FIG. 3) listing components 605 for an example report template 104. In the example report template, the first component of components 605 is a high-level report component that specifies output options, including output file format. The report component does not insert any visible output into report 118. The second component is a paragraph component used to insert formatted text. In the example report, the paragraph component inserts the following paragraph: "When peaks.m runs in the workspace, the following text is displayed to the command window:". The third component causes generation engine 110 to evaluate an expression defined within the workspace of computing environment 106. The expression, written in the internal programming language of computing environment 106, causes computing environment 106 to output a 3-dimensional graph of an equation. The fourth component of the report template instructs generation engine 110 to capture a screen snapshot of the generated figure and insert the snapshot into report 118. The last component of the report template inserts a table of selected values that presents various properties for the captured image. FIG. 7 illustrates a sample report 700 produced by report generator 108 and illustrates the corresponding output of these report components including formatted paragraph 701, equation 703, screen snapshot 705 and table 707.

FIGS. 8A, 8B and 8C, 9A and 9B and 10A and 10B list one embodiment of a set of report components that can be used to define a wide variety of report templates 114 for generating corresponding reports.

Various embodiments have been described of a method and system that provides an object-oriented, component-based report programming language by which a designer can easily customize and assemble a report at various levels of hierarchical abstraction. The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable within an operating environment of a programmable system including at least one programmable processor (computer) coupled to receive data and instructions from, and to transmit data and instructions to, a data storage system, at least one input device, and at least one output device.

Figure 11:
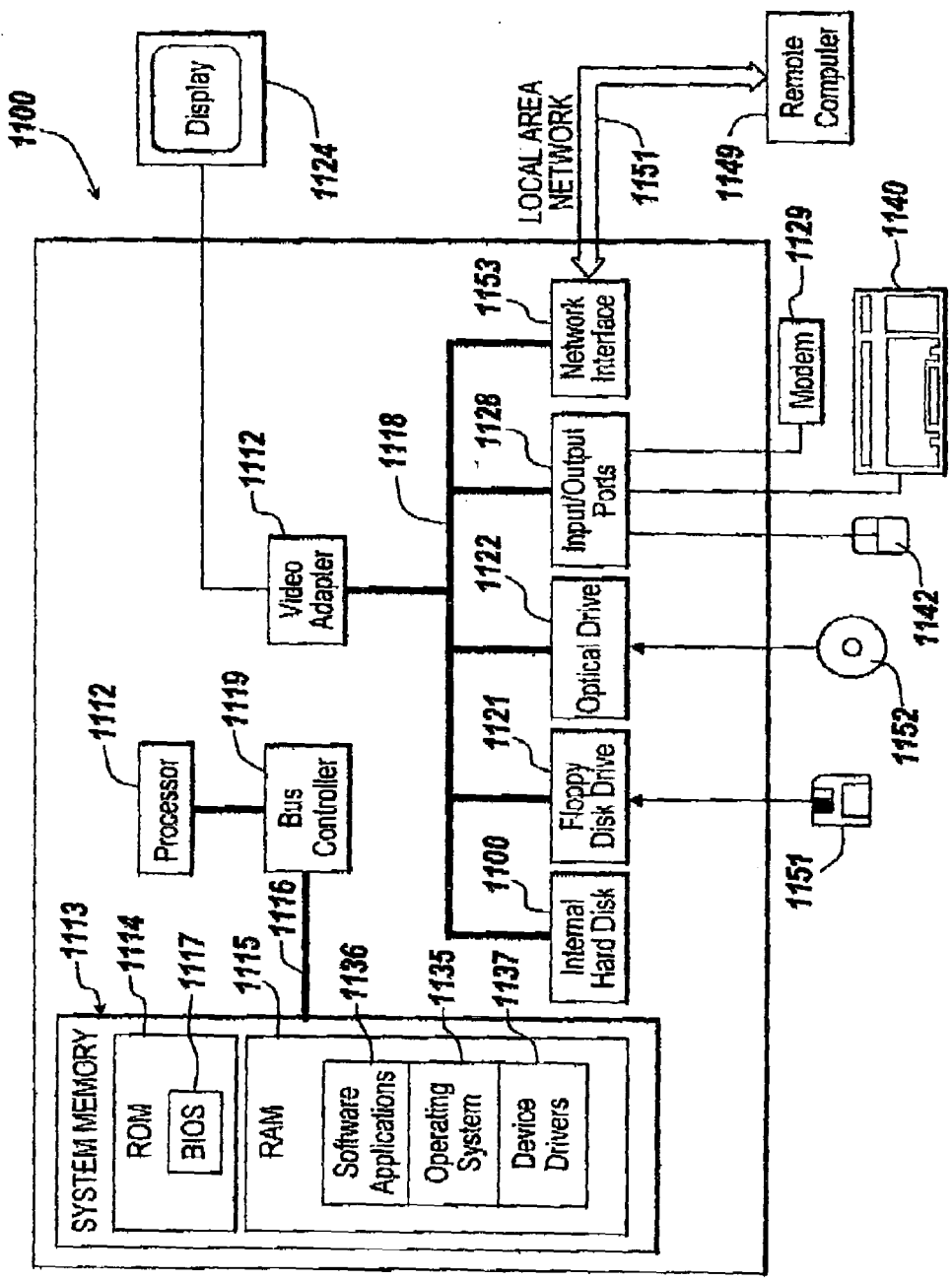
FIG. 11 illustrates on embodiment of a computer suitable for implementing the various embodiments of the invention.

An example of one such type of computer is shown in FIG. 11, which shows a block diagram of a programmable processing system (system) 1100 suitable for implementing or performing the apparatus or methods of the invention. As shown in FIG. 11, the system 1100 includes a processor 1112 that in one embodiment belongs to the PENTIUM® family of microprocessors manufactured by the Intel Corporation of Santa Clara, Calif. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. System 1100 represents any server, personal computer, laptop or even a battery-powered, pocket-sized, mobile computer known as a hand-held PC or personal digital assistant (PDA).

System 1100 includes system memory 1113 (including read only memory (ROM) 1114 and random access memory (RAM) 1115, which is connected to the processor 1112 by a system data/address bus 1116. ROM 1114 represents any device that is primarily read-only including electrically erasable programmable read-only memory (EEPROM), flash memory, etc. RAM 1115 represents any random access memory such as Synchronous Dynamic Random Access Memory.

Within the system 1100, input/output bus 1118 is connected to the data/address bus 1116 via bus controller 1119. In one embodiment, input/output bus 1118 is implemented as a standard Peripheral Component Interconnect (PCI) bus. The bus controller 1119 examines all signals from the processor 1112 to route the signals to the appropriate bus. Signals between the processor 1112 and the system memory 1113 are merely passed through the bus controller 1119. However, signals from the processor 1112 intended for devices other than system memory 1113 are routed onto the input/output bus 1118.

Various devices are connected to the input/output bus 1118 including hard disk drive 1120, floppy drive 1121 that is used to read floppy disk 1151, and optical drive 1122, such as a CD-ROM drive that is used to read an optical disk 1152. The video display 1124 or other kind of display device is connected to the input/output bus 1118 via a video adapter 1125. Users enter commands and information into the system 1100 by using a keyboard 1140 and/or pointing device, such as a mouse 1142, which are connected to bus 1118 via input/output ports 1128. Other types of pointing devices (not shown in FIG. 11) include track pads, track balls, joysticks, data gloves, head trackers, and other devices suitable for positioning a cursor on the video display 1124.

As shown in FIG. 11, the system 1100 also includes a modem 1129. Although illustrated in FIG. 11 as external to the system 1100, those of ordinary skill in the art will quickly recognize that the modem 1129 may also be internal to the system 1100. The modem 1129 is typically used to communicate over wide area networks (not shown), such as the global Internet. Modem 1129 may be connected to a network using either a wired or wireless connection. System 1100 is coupled to remote computer 1149 via local area network 1150.

Software applications 1136 and data are typically stored via one of the memory storage devices, which may include the hard disk 1120, floppy disk 1151, CD-ROM 1152 and are copied to RAM 1115 for execution. In one embodiment, however, software applications 1136 are stored in ROM 1114 and are copied to RAM 1115 for execution or are executed directly from ROM 1114.

In general, the operating system 1135 executes software applications 1136 and carries out instructions issued by the user. For example, when the user wants to load a software application 1136, the operating system 1135 interprets the instruction and causes the processor 1112 to load software application 1136 into RAM 1115 from either the hard disk 1120 or the optical disk 1152. Once one of the software applications 1136 is loaded into the RAM 1115, it can be used by the processor 1112. In case of large software applications 1136, processor 1112 loads various portions of program modules into RAM 1115 as needed.

The Basic Input/Output System (BIOS) 1117 for the system 1100 is stored in ROM 1114 and is loaded into RAM 1115 upon booting. Those skilled in the art will recognize that the BIOS 1117 is a set of basic executable routines that have conventionally helped to transfer information between the computing resources within the system 1100. Operating system 1135 or other software applications 1136 use these low-level service routines. In one embodiment system 1100 includes a registry (not shown) that is a system database that holds configuration information for system 1100. For example, the Windows® operating system by Microsoft Corporation of Redmond, Wash., maintains the registry in two hidden files, called USER.DAT and SYSTEM.DAT, located on a permanent storage device such as an internal disk.

The invention has been described in terms of particular embodiments. Other embodiments are within the scope of the following claims. For example, the steps of the invention can be performed in a different order and still achieve desirable results. This application is intended to cover any adaptation or variation of the present invention. It is intended that this invention be limited only by the claims and equivalents thereof.

What is claimed is:

1. A method for generating simulation reports based on simulation results of a system, said method comprising:
   a report generator receiving a selection of a template to generate a simulation report based on results of a simulation of the system using a model, wherein the template defines a plurality of components;
   the report generator processing the plurality of components;
   the report generator issuing a plurality of commands to a technical computing environment, wherein one of the plurality of commands instructs the technical computing environment to simulate the system using the model;
   the report generator receiving data from the technical computing environment and the simulation based on execution of the plurality of commands; and
   the report generator generating the report incorporating the received simulation data.

2. The method of claim 1 further comprising:
   the report generator issuing a command to change a parameter or an initial condition of the model used for simulation.

3. The method of claim 1 further comprising:
   the report generator issuing a command to advance the simulation time by one or more time steps.

4. The method of claim 1 further comprising:
   the report generator issuing a command to modify the model by adding or removing one or more function blocks.

5. The method of claim 1 further comprising:
   the report generator controlling the simulation of the system using the model; and
   the report generator generating the report on a state of the system at a specified simulation time.

6. The method of claim 1, wherein the system is simulated by a simulator that interacts with the technical computing environment.

7. The method of claim 1 further comprising:
   creating an additional template using the plurality of components.

8. The method of claim 1 further comprising:
   generating an intermediate representation of the report.

9. The method of claim 1 further comprising:
executing an external process to change a state of a calculation workspace of the technical computing environment.

10. The method of claim 1, wherein the template is recursively defined.

11. The method of claim 1, wherein a subset of the components defines a programming language having flow control constructs for use by the report generator and the technical computing environment.

12. The method of claim 11 further comprising:
the report generator evaluating expressions in a calculation workspace of the technical computing environment, wherein the expressions are defined using the programming language of the technical computing environment.

13. The method of claim 11 further comprising:
the report generator issuing the plurality of commands to the technical computing environment using a programming language provided by the technical computing environment.

14. The method of claim 1, wherein the components are defined using an object orientated programming language.

15. A report generation system for generating simulation reports based on simulation results of a modeled system, said report generation system comprising:
a simulator for simulating the modeled system;
a technical computing environment that interacts with the simulator, the technical computing environment including a calculation workspace that stores definitions and data of the model; and
a report generator that:
receives a selection of a template to generate a simulation report based on results of a simulation of the modeled system, wherein the template defines a plurality of components;
processes the plurality of components;
issues a plurality of commands to the technical computing environment and controls the simulation of the modeled system; and
receives data from the technical computing environment and the simulation based on execution of the plurality of commands;
wherein the report generator includes a generation engine that generates a report based on the received simulation data.

16. A medium storing computer executable instructions for generating simulation reports based on simulation results of a system, the instructions including the instructions for:
a report generator receiving a selection of a template to generate a simulation report based on results of a simulation of the system using a model, wherein the template defines a plurality of components;
the report generator processing the plurality of components;
the report generator issuing a plurality of commands to a technical computing environment, wherein one of the plurality of commands instructs the technical computing environment to simulate the system using the model;
the report generator receiving data from the technical computing environment and the simulation based on execution of the plurality of commands; and
the report generator generating the report incorporating the received simulation data.

* * * * *